Figure 1:
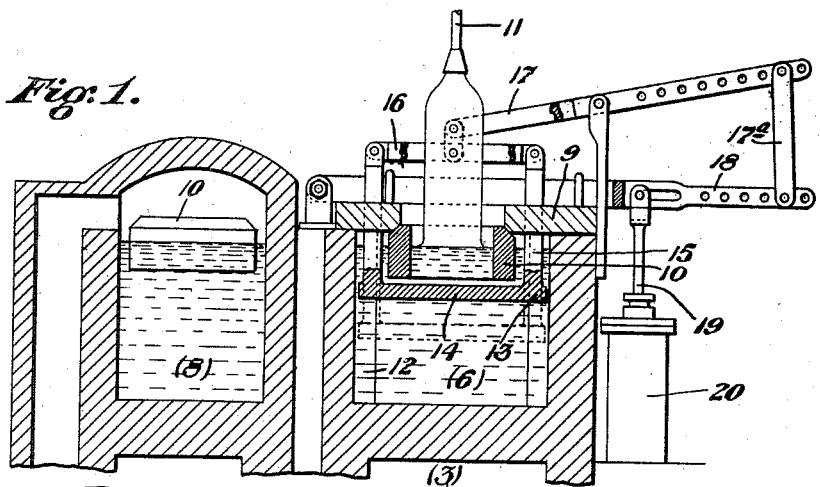

L. A. THORNBURG.
GLASS DRAWING APPARATUS.
APPLICATION FILED OCT. 5, 1910.

1,018,643.

Patented Feb. 27, 1912.

Witnesses:
Chas. S. Lepley
Fred'k. Scanb

Inventor:
Lincoln A. Thornburg
By F.W.H. Clay
his atty.

UNITED STATES PATENT OFFICE.

LINCOLN A. THORNBURG, OF MUNCIE, INDIANA, ASSIGNOR TO AMERICAN WINDOW GLASS MACHINE COMPANY, OF PITTSBURGH, PENNSYLVANIA, A CORPORATION OF NEW JERSEY.

GLASS-DRAWING APPARATUS.

1,018,643.  Specification of Letters Patent.  Patented Feb. 27, 1912.

Application filed October 5, 1910. Serial No. 585,529.

*To all whom it may concern:*

Be it known that I, LINCOLN A. THORNBURG, a citizen of the United States, residing at Muncie, in the State of Indiana, have invented certain new and useful Improvements in Glass-Drawing Apparatus, of which the following is a specification.

My invention relates generally to the window glass making art, and especially to receptacles for drawing glass cylinders by means of a bait. Its primary object is to more efficiently control the temperature conditions and facilitate the manipulation in the drawing operation.

Figure 2:
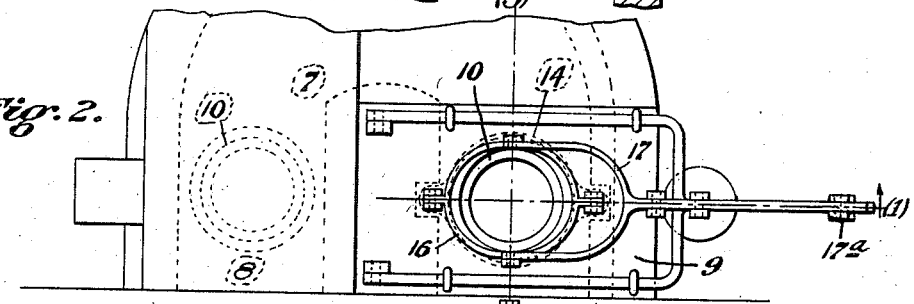
Figure 3:
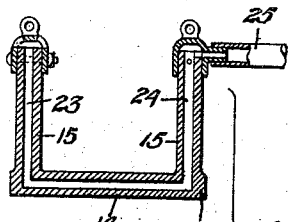
Figure 3:
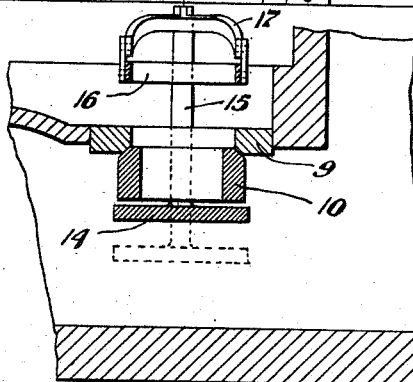
Figure 4:
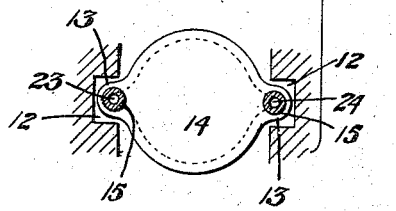

In the accompanying drawing Figure 1 is a vertical section on the line (1) in Fig. 2, of a so-called dog-house or melting furnace forehearth, and Fig. 2 is a plan view of the same. Fig. 3 is a partial vertical sectional view on the line 3—3 of Fig. 2, and Fig. 4 represents vertical and horizontal sectional views of a modification of one of the parts.

This application presents certain improvements on the apparatus set forth in my co-pending application No. 451,474, of September 3rd, 1908, (now Patent No. 979,601, of December 27th, 1910) and concerns a further improvement in the provision of a shallow body of glass for drawing, with a false bottom under the drawing point arranged to more easily clear and more definitely control the conditions of current and temperature in the glass. The body of glass from which the cylinder is being drawn is here essentially a closed pot with provisions for repeating the same temperature conditions over and over, and as soon as the cylinder is drawn, the pot separates so that the ring portion can be floated out and cleared, while the bottom portion is so situated as to be immediately freed of chilled glass and the like and returned to normal condition. In other words, I present a separable pot arranged in such condition that when the parts are separated they are easily cleared of chilled glass and can be re-assembled over and over under identically the same conditions so as to produce a uniform product.

In the drawing, the connected passages 5, 6, 7 and 8, represent respectively the mouth of a melting furnace, the intake-and-drawing chamber, the clearing passage, and the return opening to the melting furnace. In the drawing chamber 6, I provide a means, such as the cover plate 9, to hold the floating ring 10 in place for drawing with the blowpipe 11 in the usual way. On the sides of this chamber are provided guiding recesses 12 which loosely retain the extended ends 13 of a false bottom plate 14, (shown in plan at Fig. 4). These ends are provided with manipulating posts 15 arranged to connect with any convenient mechanism for raising and lowering the plate, though it will be understood that the plate tends to float upward of itself. In the present instance, I have shown a ring 16 and levers 17 and 18 connected by link 17$^a$ and operated by the piston rod 19 of a cylinder 20, which at the same time is used to raise and lower the cover plate 9 by lever 18. The passage 7 connected to chamber 6 is preferably made semi-circular and is used to return the rings 10 to the melting furnace. The construction and operation of these parts are described in my former application and are not part of the present invention.

It will observed that in operation one of the rings 10 is brought in from the melting furnace until it stands over the position of the plate 14, which at this time is lowered or deeply submerged in the body of glass. As the ring is engaged by plate 9 the bottom plate is thereupon raised until it closely approaches the ring, preferably coming in contact with it, thus practically forming a pot in the forehearth. The drawing thereupon proceeds just as in drawing from a pot, except that the temperature conditions remain identically the same throughout the draw, and more glass may be admitted if desired. When the draw is finished and the bottom of the cylinder cut-off, the ring 10 with the residue of chilled glass cut from the bottom of the cylinder which residue is dropped back into the pot is floated away and returned to the melting chamber, while the regulating plate is again lowered to normal position, deep in the glass and cleared. Each time a new ring is brought in place and the process repeated, fresh glass comes in from the tank, so that there is no reappearance of the same glass at any time. There is thus no waiting to clear the ring or pot, the false bottom never becomes chilled, and it remains at constant temperature and uniformly controls the glass being drawn. I thus gain all the advantages of drawing from a pot, while at the same time preserving the advantages of drawing from a forehearth and a large body of molten glass.

In some instances it is advantageous to specially cool the false bottom plate 14, and in this case it may be made hollow and connected with air ducts 23, 24, in the posts 15 or other means used for raising and lowering the plate, and fed by flexible pipe 25, as shown in section and plan in Fig. 4.

Having thus described my invention and illustrated its use, I claim the following:

1. In glass drawing apparatus, the combination with a vessel containing a large body of glass, of a composite drawing pot therein consisting of a floating ring and a removable bottom for the ring.

2. In glass drawing apparatus, the combination with a vessel providing a body of molten glass, of a separable drawing pot in said body of glass and means to remove the parts of said pot from the drawing point and melt out the residue glass, substantially as described.

3. The combination with a containing vessel and a series of floating rings therein, of a vertically movable false bottom for said rings having mechanism to raise and lower it in place as the rings successively are brought over said bottom.

4. In glass drawing apparatus, a glass containing vessel provided with a series of floating rings, a drawing chamber, a movable false bottom for said rings in said chamber, and mechanism to raise and lower said false bottom.

5. In glass drawing apparatus, a glass containing vessel provided with a series of floating rings, a drawing chamber, a movable false bottom for said rings in said chamber, and mechanism to raise and lower said false bottom and a topstone for said chamber simultaneously operated by the same means.

6. A glass drawing receptacle adapted to float in a bath of molten glass and composed of separable parts forming, when joined, a closed pot.

7. The combination with a furnace having a melting chamber, a drawing chamber and a return passage to the melting chamber, of a series of floating rings, a submerged vertically movable bottom plate in the drawing chamber and means to successively place said rings on said plate to form a temporary closed drawing vessel and then separate and clear the rings and plate in the main body of glass.

In testimony whereof I have hereunto signed my name in the presence of the two subscribed witnesses.

LINCOLN A. 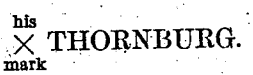 THORNBURG.

Witnesses:
  Chas. S. Lepley,
  Fredk. Staub.

---

Copies of this patent may be obtained for five cents each, by addressing the "Commissioner of Patents, Washington, D. C."